US012566247B2

(12) United States Patent
Krajnc et al.

(10) Patent No.: US 12,566,247 B2
(45) Date of Patent: Mar. 3, 2026

(54) SYSTEM, NETWORK, METHOD AND COMPUTER PROGRAM FOR CONTROLLING A RE-BASELINING OF A NETWORK DEVICE BEING PART OF THE NETWORK

(71) Applicant: SIGNIFY HOLDING B.V., Eindhoven (NL)

(72) Inventors: Hugo Jose Krajnc, Eindhoven (NL); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 430 days.

(21) Appl. No.: 17/779,047

(22) PCT Filed: Nov. 23, 2020

(86) PCT No.: PCT/EP2020/083005
§ 371 (c)(1),
(2) Date: May 23, 2022

(87) PCT Pub. No.: WO2021/105031
PCT Pub. Date: Jun. 3, 2021

(65) Prior Publication Data
US 2023/0350015 A1      Nov. 2, 2023

Related U.S. Application Data

(60) Provisional application No. 62/940,310, filed on Nov. 26, 2019.

(30) Foreign Application Priority Data

Dec. 10, 2019    (EP) ..................................... 19214865

(51) Int. Cl.
*G01S 7/40* (2006.01)
*G01S 7/00* (2006.01)
(Continued)

(52) U.S. Cl.
CPC ................ *G01S 7/40* (2013.01); *G01S 7/006* (2013.01); *G01S 13/003* (2013.01); *G01S 13/04* (2013.01); *H04W 4/38* (2018.02)

(58) Field of Classification Search
CPC .......... G01S 7/40; G01S 7/006; G01S 13/003; G01S 13/04; G01S 5/02; H04W 4/38;
(Continued)

(56) References Cited

U.S. PATENT DOCUMENTS

| | | | |
|---|---|---|---|
| 10,142,785 B2 | 11/2018 | Wootton et al. | |
| 2012/0146788 A1* | 6/2012 | Wilson ................ | G08B 13/187 |
| | | | 340/539.23 |

(Continued)

FOREIGN PATENT DOCUMENTS

| | | |
|---|---|---|
| WO | 2016089714 A1 | 6/2016 |
| WO | 2018187266 A1 | 10/2018 |

(Continued)

*Primary Examiner* — Vladimir Magloire
*Assistant Examiner* — Ramesh R Guyah

(57) ABSTRACT

The invention refers to a system that allows to improve a detection accuracy in network RF sensing. A system (150) for controlling a re-baselining of a network device (110) is presented, wherein a new baseline is determined based on a detection signal detected by the network device and/or detected by other network devices (130, 120), wherein the system comprises a detection signal providing unit (151) for providing a detection signal detected by the network device and/or by other network devices in the detection area, a quality criterion checking unit (152) for checking if a predetermined quality criterion for a re-baselining is fulfilled based on the provided detection signal, and a re-baselining unit (156) for controlling the network device to re-baseline if the predetermined quality criterion is fulfilled. Thus, the long term detection accuracy in detecting the presence or absence of a subject in the detection area can be improved.

13 Claims, 2 Drawing Sheets

(51) Int. Cl.
  *G01S 13/00*        (2006.01)
  *G01S 13/04*        (2006.01)
  *H04W 4/38*        (2018.01)
  *G10L 21/02*        (2013.01)
  *H05B 47/125*        (2020.01)

(58) Field of Classification Search
  CPC ....... H04W 4/00; H04W 24/08; H04W 24/10;
        H04W 84/18; H04K 2203/16; H04K
        2203/18; H04K 3/80; G01D 21/00; G01V
        11/002; G08B 13/02; G08B 13/187;
        G08B 13/2491; G08B 21/22; G08B
        13/24; G08B 21/0415; H04B 17/318
  USPC ................... 342/27; 340/539.23, 552, 573.1;
                        370/252
  See application file for complete search history.

(56)            References Cited

U.S. PATENT DOCUMENTS

2016/0164563 A1     6/2016  Khawand et al.
2017/0078488 A1 *   3/2017  Cartwright ............. G10L 21/02
2017/0366938 A1    12/2017  Wootton et al.
2018/0014160 A1 *   1/2018  Wootton .............. H04L 1/0018
2018/0292520 A1    10/2018  Bermudez et al.
2018/0295633 A1 *  10/2018  Abdelmonem ... H04W 72/0453
2019/0246477 A1 *   8/2019  Sinitsyn .............. H05B 47/125

FOREIGN PATENT DOCUMENTS

WO        2019032718 A1     2/2019
WO      WO-2019027968 A1 *   2/2019   ......... G08B 21/0415

* cited by examiner

SYSTEM, NETWORK, METHOD AND COMPUTER PROGRAM FOR CONTROLLING A RE-BASELINING OF A NETWORK DEVICE BEING PART OF THE NETWORK

CROSS-REFERENCE TO PRIOR APPLICATIONS

This application is the U.S. National Phase application under 35 U.S.C. § 371 of International Application No. PCT/EP2020/083005, filed on Nov. 23, 2020, which claims the benefits of European Patent Application No. 19214865.8, filed on Dec. 10, 2019 and U.S. Patent Application No. 62/940,310, filed on Nov. 26, 2019. These applications are hereby incorporated by reference herein.

FIELD OF THE INVENTION

The invention relates to a system, a network comprising the system, a method and a computer program for controlling a re-baselining of a network device being part of a network of network devices.

BACKGROUND OF THE INVENTION

In modern smart home applications generally a plurality of devices work together by forming a network which is built and maintained by using wireless signals transmitted between the network devices. The wireless communication signals used by these network devices have been found to allow a quite reliable detection of motion, presence and/or occupancy in the area of the network. This kind of motion, presence and/or occupancy detection is very convenient for such smart home applications, for instance, for applications like turning devices on/off based on a presence of a user in a room, or for counting the number of people present in a room and controlling an air conditioning accordingly, etc., since it removes the necessity for providing a dedicated presence or motion sensor like an infrared sensor. Generally, the detection method used by the network devices is based on comparing a current detection signal, i.e. a signal obtained by detecting the current communication of the network, for instance, a communication signal sent to the network device by another network device, with a previously established baseline signal such that each change of the current detection signal with respect to the baseline signal can be determined and analyzed to determine, for instance, the presence or absence of a subject in the detection area of the network device. The accuracy of the detection result thus strongly depends on the quality of the current detection signal and also on the quality of the baseline signal.

WO 2019/032718A1 discloses method for detecting the presence of a body in a network without fiducial elements, using signal absorption, and signal forward and reflected backscatter of radio frequency (RF) waves caused by the presence of a biological mass in a communications network.

SUMMARY OF THE INVENTION

It is an object of the present invention to provide a system, a network, a method and a computer program that allow to improve the detection accuracy in detecting the presence or absence of a subject using wireless signals of a network.

In a first aspect of the invention a re-baselining control system for controlling a re-baselining of a network device being part of a network of network devices is presented, wherein the re-baselining refers to determining a new baseline for the detection of a subject in a detection area, wherein the new baseline is determined based on a detection signal detected by the network device and/or detected by other network devices being part of the network, wherein the re-baselining control system comprises a) a detection signal providing unit for providing a detection signal detected by the network device and/or by other network devices being part of the network in the detection area, wherein the detection signal is indicative of a presence or absence of a subject in the detection area and is usable for determining a baseline, b) a quality criterion checking unit for checking if a predetermined quality criterion for a re-baselining is fulfilled based on the provided detection signal, and c) a re-baselining unit for controlling the network device to re-baseline if the predetermined quality criterion is fulfilled.

Since the quality criterion checking unit checks if a predetermined quality criterion for a re-baselining is fulfilled based on the provided detection signal, and since the re-baselining unit controls a network device to re-baseline only if the predetermined quality criterion is fulfilled, it is ensured that a baseline with a high quality is determined as new baseline. In particular, it can be ensured that the same detection quality is maintained throughout the application also when it becomes necessary to determine a new baseline, for instance, due to changes in the environment. Thus, the long term detection accuracy in detecting the presence or absence of a subject in the detection area can be improved.

The re-baselining control system is adapted to control a re-baselining of a network device being part of a network of network devices. Moreover, the re-baselining control system can also be adapted to control the re-baselining of more than one network device, for instance, of the re-baselining of all network devices being part of the network. For example, the re-baselining control system can be adapted to control the re-baselining of a group of network devices to determine a baseline for the whole group of network devices, for instance, based on the detection signals of all members of the group. In such a case the baseline can refer to an $n \times n$ matrix of baseline values, wherein n refers to the number of devices in the group and wherein the baseline is associated with, i.e. used by, all members of the group. The group of network devices can comprise all network devices of a network or only a selected part of the network devices of a network. For instance, the network devices can be selected based on pre-knowledge on the quality of the detected signal of the devices, the location of the devices, the characteristics of the devices, etc. The baseline determined by using the detection signals of the members of the group of network devices can then also be used as baseline for all other network devices of the network or for a part of the other network devices of the network that are not part of the selected group.

The network device can be any network device being part of a wireless network formed by a plurality of network devices. Preferably, the network device is a device that is useable as part of a smart home or office application. For instance, the network device can be a sensor device, like a temperature sensor, an application providing device providing an application to a user, like a smart TV, loudspeakers, heating unit, etc., and/or a controlling device, for instance, for controlling other network devices of the network. In a preferred embodiment the network device is a smart lighting device that is part of a network comprising further smart lighting devices. The network devices of the network use wireless signals for communicating with each other and for maintaining the network such that substantially at all times a wireless signal of network communication can be measured by the network device, i.e. a wireless signal is transmitted to the network device such that it can be detected by the network device. In an embodiment, the wireless signal can also be provided by the network device itself, for instance, by transmitting wireless signals into the detection area, when none of the other network devices currently transmit a wireless signal. Preferably, the network devices use radio frequency signals as communication signals, like WiFi signals, etc. The re-baselining refers to determining a new baseline with which current detection signals measured by the network device can be compared for the detection of a subject in a detection area of the network. The subject detected in this way can be any kind of subject showing movement at least in some parts. For instance, if the subject is a human being, it can be detected based on movement of the arms, legs, chest or other parts of its body. For instance, the subject can be a moveable object like a cleaning robot, or the subject can be a human being or an animal that can be detected based on its body movements, like hand gestures, breathing movements or walking movements.

The new baseline can be determined for the network device, but can also be communicated to other network devices and in this case can also be used by the other network devices of the network as baseline. A new baseline is determined based on a detection signal, for instance, a radio frequency signal or a detected metric of a radio frequency signal, detected by the network device and/or detected by other network devices being part of the network. For instance, the new baseline can be determined by storing at least a part of a past or currently detected detection signal as baseline, or might be determined, for instance, by averaging, weighted averaging, non-linear combinations, etc. of parts of past or currently detected detections signals detected by the network device and/or other network devices of the network.

A detection signal providing unit is adapted to provide a detection signal detected by the network device and/or by other network devices being part of the network in the detection area. The detection signal providing unit can be a storing unit in which the detection signal is stored already and from which the detection signal can be retrieved. Also, the detection signal providing unit can be a retrieving unit for retrieving the detection signal from, for instance, at least one network device being part of the network for which a new baseline should be determined, wherein the detection signal providing unit is then adapted to provide the received detection signal.

The detection signal is indicative of the presence or absence of a subject in the detection area, i.e. can be used as part of a detection method that allows presence detection in a detection area. For instance, the detection signal can be compared to a baseline to determine differences between the detection signal and the baseline that are indicative of the presence of a subject in the detection area. In an example, the detection signal can refer to a detected signal strength of a network communication signal, for instance, the received signal strength indicator (RSSI). In this case the baseline can be a recording of the signal strength over time. During the detection dynamic variations in the signal strength can be determined and compared to the baseline to determine a difference between the currently detected signal and the baseline. The differences can be determined in terms of, for instance, the amplitude, the peak-to-peak swing, the standard variation, the frequency components, etc. These differences can be indicative of a presence or movement in the detection area disturbing the network communication signal, and the network device can be trained or programmed to interpret these differences accordingly. However, also other detection methods known in the art can be used for detecting the presence or absence of a subject in a detection area based on network communication signals.

Moreover, the detection signal is generally usable for determination of a baseline for the network device that can be used as baseline for a presence or absence detection of a subject in the detection area.

A quality criterion checking unit is adapted to check if a predetermined quality criterion for re-baselining is fulfilled based on the provided detection signal. For instance, the quality criterion checking unit can comprise a storing unit on which one or more predetermined quality criteria are stored, wherein the quality criterion checking unit can then check if one or more of the predetermined quality criteria are fulfilled based on the provided detection signal. Preferably, a quality criterion refers to a specific characteristic or condition of the provided detection signal such that the checking if the predetermined quality criterion is fulfilled refers to checking if the provided detection signal comprises the predetermined characteristics or fulfills the predetermined conditions. The predetermined quality criterion can refer to one specific quality criterion, for instance, to one specific characteristic of the detection signal, or can refer to a plurality of specific quality criteria, for instance, to a plurality of specific characteristics of the detection signal, wherein the quality criterion can be regarded as being fulfilled a) if one of the specific quality criteria is fulfilled, b) if all of the specific quality criteria are fulfilled and c) if at least some of the specific quality criteria are fulfilled. Moreover, the specific quality criteria can also refer to specific quality criteria for detection signals provided from different network devices or can depend on which network device is controlled to re-baseline by the re-baselining control system. The specific quality criteria can be the same or different for each network device.

The re-baselining unit is adapted to control the network device to re-baseline if the predetermined quality criterion is fulfilled. In particular, the re-baselining unit can be adapted to control the network device to use a past or present part of the provided detection signal to determine a new baseline for the network device. Moreover, if it can be assumed that the quality criterion will also be fulfilled for a future time, for instance, for the near future like the next few minutes, the re-baselining unit can be adapted to control the network device to use a future part of the detection signal provided during this future time to determine a new baseline for the network device. For instance, the re-baselining unit can be adapted to control the network device to use a currently detected detection signal to determine a new baseline if it is shown that the currently detected detection signal fulfills the quality criteria. Additionally or alternatively, the re-baselining unit can be adapted to control the network device to use a part of a past detected and possibly recorded detection signal to determine the new baseline if it is shown that the part of the past detected detection signal fulfills the quality criterion.

In an embodiment, the predetermined quality criterion refers to ensuring that no more than a predetermined maximal number of subjects is present in the detection area for the re-baselining. The predetermined maximal number of subjects present in the detection area can refer to an absolute number, for instance, to a number of persons that should maximally be present in the detection area, or to a relative number referring to a relative occupancy level of the detection area, for instance, to an occupancy of maximally 10% of the detection area. In case of providing as occupancy level a maximal number of subjects it becomes easier to also take non-human beings, like small animals or small cleaning robots that move around in the detection area, into account. For instance, it could be acceptable if a small animal that lives in the detection area is present and provides an occupancy of perhaps 2%, whereas the presence of a human presenting an occupancy of perhaps over 10% would not be acceptable for re-baselining. In a preferred embodiment, the maximal number of subjects present in the detection area is zero, i.e. no subject being moveable or comprising moveable parts should be present in the detection area for re-baselining. However, particularly in large and very crowded places, it might never be possible to fulfill a quality criterion referring to zero subjects in the detection area, in which case it might be acceptable if a higher maximal number of subjects is determined, for instance, three or four subjects or an occupancy level of 20%. Thus, the predetermined maximal number of subjects can be determined based on the general knowledge about the detection area, the application/sensing goal that should be obtained, and the presence or absence of subjects in the detection area. Moreover the maximal number of subjects can even change with time. For instance, for a re-baselining in a crowded area at daytime a higher maximal number of subjects can be acceptable than for re-baselining for the same area at night.

Preferably, in this embodiment the quality criterion checking unit is adapted to check, based on the provided detection signal, the number of subjects in the detection area or the level of occupancy in the detection area and then determine if this number or level fulfills, i.e. is below, the predetermined maximal number of subjects. The re-baselining unit can then control the network device to re-baseline if the detected number of subjects is below the maximal number of subjects for a current or a past detection signal. In particular, the re-baselining unit can be adapted to control the network device to re-baseline by determining the new baseline based on the part of the detection signal for which the number of detected subjects was or is below the maximal number of detected subjects.

In an embodiment, the re-baselining control system further comprises a signal initiating unit, wherein the signal initiating unit is adapted to initiate a user perceptible output from the network device or a device connected to the network device via the network to notify a potential subject in the detection area of an intention to re-baseline. For instance, the signal initiating unit can be adapted to provide a control signal to the network device or a device connected to the network device via the network to provide the user perceptible output. Preferably, the user perceptible output refers to a visible, sensible or audible signal. The output can be, for instance, a lighting output like a blinking of a light or display that a user can perceive. Moreover, the visible output can also refer to a more complex output, like a text message provided on a screen of a network device explaining the situation, etc. The output can also be an audible signal like an alarm signal, a beeping signal or any other signal that can be heard by a person present in the detection area. Further, also in this case the output signal can be more complex and refer, for instance, to a voice message stating that a re-baselining will start, etc. Moreover, the output can be a sensible output like a vibration of a device or surface in touch with the user. Further, in one embodiment a signal initiating unit can be adapted to control a device connected to an animal, like a collar, to initiate a perceptible output that can be perceived by the animal such that the animal can be trained to leave the detection area based on the perceptible output.

The signal initiating unit can be adapted to initiate the user perceptible signal directly when a re-baselining procedure is initiated by the re-baselining control system and/or can be adapted to initiate the user perceptible signal based on a request, for instance, of the quality criterion checking unit. In this case, the quality criterion checking unit can be adapted to request the initiation of the user perceptible signal based on the result of a quality criterion check, preferably, if a quality criterion is not fulfilled, for instance, due to the presence of a subject in the detection area. Since the signal initiating unit initiates the user perceptible output, a user perceiving the output and being present in the detection area can leave the detection area such that a re-baselining can be performed after the quality criterion checking unit has checked that the user has left the room.

In an embodiment, the quality criterion checking unit is adapted to check as predetermined quality criterion if a change is detected between the detection signal detected before the user perceptible output and the detection signal detected during and/or after the user perceptible output that indicates the presence of a subject in the detection area. For instance, if a person or an animal was sleeping in the room, and if the quality criterion checking unit did check as predetermined quality criterion if the predetermined maximal number of subjects is present in the detection area, it might possibly, due to the motionlessness of the person or animal, determine that the quality criterion is considered as fulfilled. However, if the quality criterion checking unit is adapted to check as quality criterion if a change is detected in the detection signal during and/or after the user perceptible output, i.e. when the person or animal has been woken up by the user perceptible output and now is moving around in the detection area, it can be determined based on the change that the person or animal is present in the room and thus that the predetermined quality criterion cannot be regarded as being fulfilled. Preferably, a user reaction time is predetermined during which, after the initiating of the user perceptible output, it is checked by the quality criterion checking unit if a change between the detection signal before the user perceptible output and the detection signal detected during the user reaction time can be determined. The quality criterion can then be regarded as being fulfilled if after the predetermined user reaction time no changes are detected, which indicates the absence of the subject in the detection area, and/or if changes are detected that indicate that no more than the predetermined maximal number of subjects is present in the detection area.

In an embodiment, the re-baselining unit is adapted to postpone the re-baselining until no more than a predetermined maximal number of subjects is detected in the detection area. In particular, in this embodiment the re-baselining unit is adapted to control the network device to re-baseline based on a currently detected detection signal only if the predetermined quality criterion for re-baselining is fulfilled, i.e. if no more than a predetermined maximal number of subjects is detected based on the current detection signal in the detection area. Thus, it can be ensured that the baseline is only determined from a current detection signal when it can be expected that the quality of the baseline will be high, i.e. that the determination of the baseline will not be disturbed by movements of subjects in the detection area.

In an embodiment, the re-baselining control system further comprises a potential new baseline determination unit for determining a potential new baseline based on the detection signal, wherein the quality criterion checking unit is adapted to check if the predetermined quality criterion for a re-baselining is fulfilled further based on the potential new baseline, wherein, if it is determined that the quality criterion is fulfilled, the re-baselining unit is adapted to control the re-baselining such that the potential new baseline is determined as new baseline for the detection of the presence or absence of a subject in the detection area. The potential new baseline determination unit is adapted to determine a potential new baseline based on the detection signal, for instance, based on a past or current part of the detection signal. In this embodiment, the quality criterion checking unit is adapted to further take the potential new baseline into account when checking if the predetermined quality criterion is fulfilled.

In a preferred embodiment, the quality criterion checking unit is adapted to compare detection results obtained based on the potential new baseline and the provided detection signal with detection results obtained based on a baseline used by at least one other network device during a predetermined test period, wherein the detection areas of the network devices partially overlap, and wherein the quality criterion is considered as fulfilled if the detection results are substantially similar during the predefined test period in the overlapping detection area. In particular, the quality criterion checking unit can be adapted to use the provided current or past detection signal and to determine the presence or absence of a subject based on the current or past part of the detection signal and the potential new baseline. Further, the quality criterion checking unit can then be adapted to receive the detection results of one or more other network devices being part of the network for the same detection time, which have been determined by the one or more network devices based on a baseline used by these network devices. In particular, the results can be compared for a predetermined test period, wherein the predetermined test period can be a past time period if the results are determined based on past detection signals or a current time period if the results are determined based on current detection signals using the different baselines. The quality criterion is then considered as fulfilled if the detection results in the predetermined test period can be considered as being substantially similar for the partially overlapping detection area. Substantially similar signals are generally signals that are similar up to a predetermined accuracy measure, i.e. a tolerance, wherein the accuracy measure can be determined, for instance, based on knowledge about the general accuracy of the detection method or knowledge about the general accuracy of the detection signals. For instance, in a very noisy environment in which it is know that the detection signals are also very noisy, the accuracy measure can be higher than in an environment for which it is known that detection signals are very accurate.

In a preferred embodiment, the quality criterion checking unit is adapted to check as quality criterion the detection results obtained based on the new potential baseline for consistency with predefined knowledge about the detection area, wherein the quality criterion is considered as fulfilled if the detection results are consistent with predefined knowledge about the detection area during a predefined test period. Also in this embodiment the predefined test period can refer to a past or current time period during which the detection signal is detected that is provided by the detection signal providing unit and that is used to determine the detection results based on the potential new baseline. The predefined knowledge can be any knowledge about the occupancy of the detection area during the predefined test period. For instance, it might be known that during a current or past time period, for instance, ten minutes, no person is present in the detection area, because the detection area is part of a business building and the detection time refers to a night time. In this case, the quality criterion checking unit can be adapted to determine if a detection result that is determined based on the detection signal for this detection time and the new potential baseline also indicates that no person is present in the detection area. The predefined knowledge can also be knowledge that is obtained through an additional sensor, in particular, through additional sensors being also part of the network of the network device. For instance, the additional sensor can be a passive infrared sensor determining the presence or absence of a subject in the area. Moreover, other network devices being part of the network can provide information that can be considered as being part of the predefined knowledge, for instance, a light switch that was manually activated by a user indicates that at the time at which the light switch was activated a person was present in the detection area, if the light switch is also part of the detection area. Thus, the quality criterion checking unit can in such a case check if a detection result based on the new potential baseline and the detection signal obtained at the time at which the light switch was operated refers to the presence of at least one person in the detection area. Generally, a plurality of these predefined knowledge criteria can be provided as quality criterion and the quality criterion checking unit can consider the quality criterion as being fulfilled a) if at least one of the predefined knowledge criteria is fulfilled, b) if all of the predefined knowledge criteria are fulfilled, or c) if at least some of the predefined knowledge criteria are fulfilled.

In an embodiment, the re-baselining control system further comprises an old baseline storing unit for storing as old baseline the baseline currently used for detecting the presence or absence of a subject, wherein the quality criterion checking unit is adapted to compare detection results obtained based on the potential new baseline and the old baseline, respectively, during a predetermined test period, wherein the quality criterion is considered as fulfilled if the detection results are substantially similar during the predefined test period. The old baseline storing unit is adapted to store as old baseline the baseline currently used for detecting the presence or absence of a subject. Also in this case the predetermined test period can be a past or current test period and refers to a test period for which detection signals are provided that can be used for comparing the detection results obtained from the provided detection signal based on the potential new baseline and based on the old baseline. Also in this embodiment, as already described above, the detection results can be considered as being substantially similar if the detection results are similar according to a predetermined accuracy measure, i.e. tolerance.

Preferably, the re-baselining control system is adapted to combine the above described embodiments such that the detection results obtained based on the potential new baseline, the old baseline and based on a baseline used by at least one other network device are compared. The quality criterion checking unit can then be adapted to consider the quality criterion as being fulfilled a) if at least one of the comparisons leads to substantially similar detection results, or b) if all of the comparisons lead to substantially similar detection results, i.e. if the detection result for the potential new baseline, the detection results for the old baseline and the detection results for the baselines used by the other network devices are substantially similar.

In an embodiment, the re-baselining control system can also be adapted to combine the above defined embodiments such that the quality criterion checking unit is not only adapted to check as quality criterion if the detection results obtained with the new potential baseline are substantially similar to detection results obtained based on the old baseline and/or based on the baseline used for other network devices, but to check if they are additionally also consistent with the predefined knowledge.

In an embodiment, the re-baselining control system can be adapted to combine all of the above described embodiments. For instance, the quality criterion checking unit can be adapted to first check if no more than a predetermined number of subjects is present in the detection area, optionally during or after the initiating of a user perceptible signal, and if this quality criterion is fulfilled, the potential new baseline determination unit can be adapted to determine the potential new baseline based on the part of the detection signal for which the quality criterion that no more than a predetermined maximal number of subjects is present in the detection area was fulfilled. Further, the quality criterion checking unit can then be adapted to check further quality criteria based on the potential new baseline and based on the detection signal as described above.

In an embodiment, if the quality criterion is not considered as fulfilled, the re-baselining unit is adapted to control the re-baselining such that the old baseline is determined as baseline for the detection of the presence or absence of a subject in the detection area and/or the re-baselining is initiated again after a predetermined time period. The predetermined time period can, for instance, refer to a short period if it is expected that the occupancy situation of the detection area changes fast and can then be, for instance, around a few minutes, or can refer to a longer time period, for instance, a few hours, if it is known that the occupancy situation of the detection area only changes on longer time scales. Alternatively, if the quality criterion is not considered as fulfilled, but it can be determined, for instance, based on a characteristic of the detection signal and/or pre-knowledge, that the quality criterion will be fulfilled after a short time period, the re-baselining unit can be adapted to control the re-baselining such that the baseline is determined based on a detection signal detected after the short time period. For instance, if the detection signal indicates the presence of a human in a room such that the quality criterion is not fulfilled, but it is known that ten minutes later all humans have to leave the room, for instance, due to a closure time, or if the signal indicates that the human is already in the process of leaving the room and will be out of the room in two minutes, the re-baselining unit can control the re-baselining such that the baseline is determined based on a detection signal detected after this time, for instance, after ten or two minutes.

In an embodiment, the re-baselining control system further comprises a signal initiating unit, wherein the signal initiating unit is adapted to initiate a user perceptible output from the network device or a device connected to the network device via the network, wherein, if a result of the checking if the quality criterion is fulfilled is ambiguous, the re-baselining unit can be adapted to control the signal initiating unit to initiate the user perceptible output to notify a potential subject in the detection area of an intention to re-baseline. A result of the checking of the quality criterion can be considered as being ambiguous, for instance, if a predetermined ambiguity criterion is fulfilled. The ambiguity criterion can be determined for each quality criterion individually and can refer, for instance, to a certain similarity measure range if the similarity of two signals should be determined, to a certain detection signal characteristic, like a certain noise level of the detection signal, since it can be assumed that for a certain noise level the detection of the presence of a small animal or only one person in the detection area is difficult, etc. The result is then considered as being ambiguous if the detection signal fulfills the predetermined ambiguity criterion.

In another aspect of the invention a re-baselining control method for controlling a re-baselining of a network device being part of a network is presented, wherein the re-baselining refers to determining a new baseline for the detection of a subject in a detection area, wherein the new baseline is determined based on a detection signal detected by the network device, wherein the re-baselining control method comprises a) providing a detection signal detected by the network device in the detection area, wherein the detection signal is indicative of a presence or absence of a subject in the detection area, b) checking if a predetermined quality criterion for a re-baselining is fulfilled based on the provided detection signal, and c) controlling the network device to re-baseline if the predetermined quality criterion is fulfilled.

In another aspect of the invention a re-baselining control method for controlling a re-baselining of a network device being part of a network of network devices is presented, wherein the re-baselining refers to determining a new baseline for the detection of a subject in a detection area, wherein the new baseline is determined based on a detection signal detected by the network device and/or detected by other network devices being part of the network, wherein the re-baselining control method comprises a) providing a detection signal detected by the network device and/or by other network devices being part of the network in the detection area, wherein the detection signal is indicative of a presence or absence of a subject in the detection area and is usable for determining a baseline, b) checking if a predetermined quality criterion for a re-baselining is fulfilled based on the provided detection signal, and c) controlling the network device to re-baseline if the predetermined quality criterion is fulfilled.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
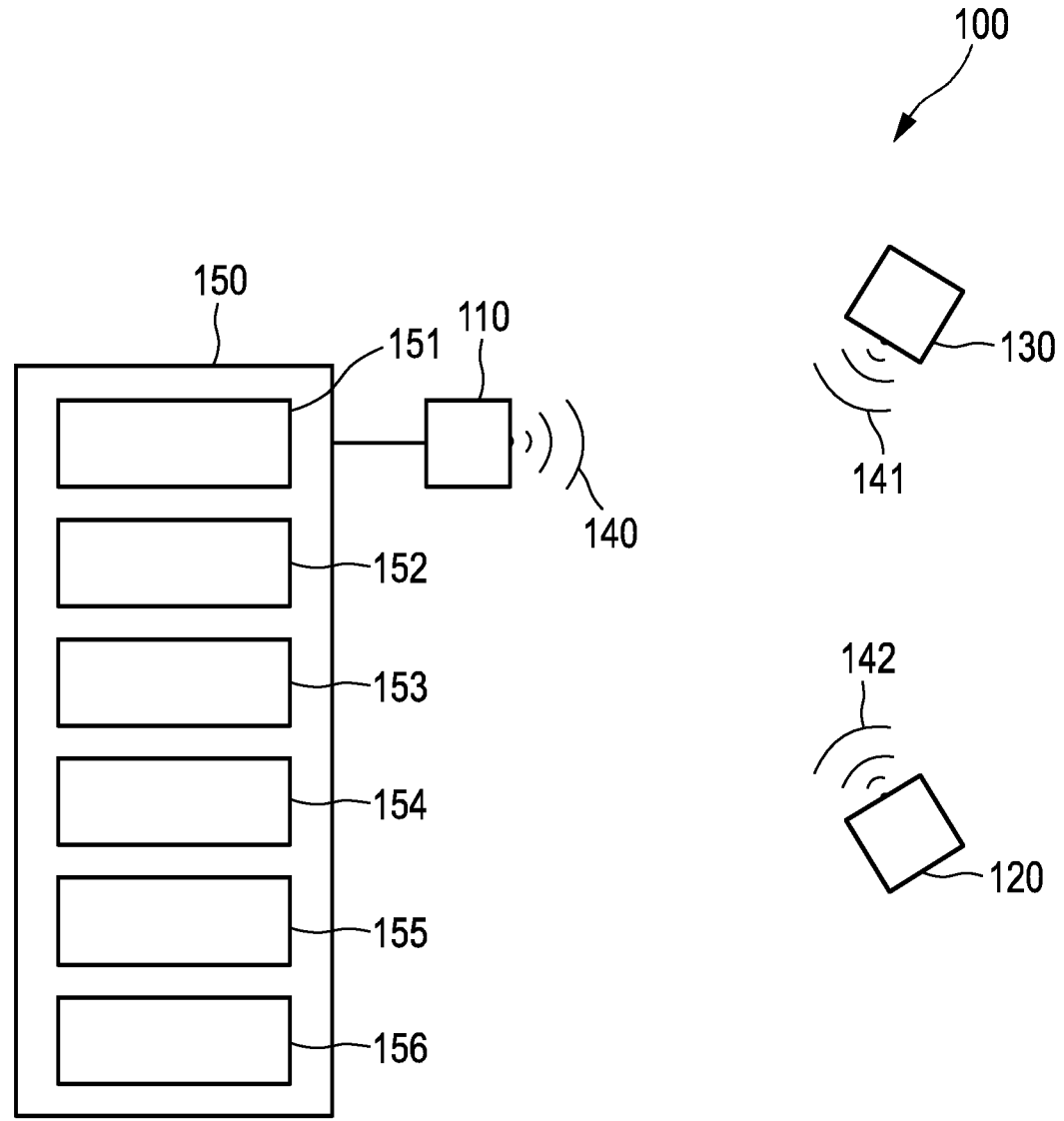
FIG. 1 shows schematically and exemplarily an embodiment of a network of a plurality of network devices comprising a re-baselining control system according to the invention.

FIG. 1 shows schematically and exemplarily an embodiment of a network with a plurality of network devices comprising a re-baselining control system. The network 100 is formed by network devices 110, 120 and 130 communicating with each other and maintaining the network 100 via radio frequency signals 140, 141 and 142. The network devices are preferably smart lighting devices, but can also refer to smart devices with other functional capabilities. Radio frequency signals 140, 141, 142 are used for maintaining the network or for communicating with each other, wherein these network communication signals can be detected by the network device 110. Changes in a communication signal itself or in a metric of a communication signal can be indicative for changes in the environment of the network 100, for instance, due to the movement of a subject in a detection area of the network 100.

In the here described embodiment, at least network device 110 is adapted to detect the network communication signals or a metric of the network communication signals as detection signal and to determine based on this detection signal and based on a previously determined or provided baseline the presence or absence of a subject in a detection area of the network 100. Since the characteristics, for instance, the metric, of the communication signals that is indicative of movement in the detection area of the network 100 might change over time, for instance, due to changes in the environment of the detection area of the network 100, the determination of a new baseline for the detection signals is necessary in regular intervals to ensure that the presence or absence of a subject can still be detected accurately.

In this respect, network 100 comprises re-baselining control system 150. In this example, re-baselining control system 150 is adapted to be connected to network device 110 and to control the re-baselining of the network device 110. However, in other embodiments the re-baselining control system 150 of the network 100 can also be connected to all network devices 110, 120, 130 or to a certain part of the network devices, for instance, network devices 110 and 130.

In this embodiment the re-baselining control system 150 comprises a detection signal providing unit 151 that is adapted to receive a detection signal detected by network device 110 and to provide the detection signal detected by a network device 110. The detection signal is indicative of a presence or absence of a subject in the detection area of the network 100 and is generally useable for determining a baseline for the network device 110.

Further, the re-baselining control system 150 comprises a quality criterion checking unit 152 that is adapted to check if a predetermined quality criterion for a re-baselining is fulfilled based on the provided detection signal from the detection signal providing unit 150. For instance, the quality criterion checking unit 152 can be adapted to check as a quality criterion based on the provided detection signal and based on the currently used baseline if a predetermined maximal number of subjects is present in the detection area of the network 100.

Further, the re-baselining control system 150 can comprise a signal initiating unit 153 that is adapted, for instance, to control network device 110 comprising a lighting functionality to initiate a user perceptible output, in this case a user perceptible lighting signal. The quality criterion checking unit 152 can in this case be adapted to check during or shortly after the user perceptible output if the provided detection signal indicates a presence of more than the predetermined maximal number of subjects in the detection area, for instance, based on the movement started by the subjects in response to the initiated output signal.

The re-baselining control system can also comprise a potential new baseline determination unit 154 that is adapted to determine a potential new baseline based on the provided detection signal. The potential new baseline determination unit 154 can be adapted to generally determine a potential new baseline when a re-baselining process is initiated or can be adapted, for instance, to determine a potential new baseline if the quality criterion checking unit 152 has already determined that a quality criterion is fulfilled. For example, if the quality criterion checking unit has determined that less than a predetermined maximal number of subjects is present in the detection area during or after the user perceptible output, the potential new baseline determination unit can be adapted to determine a potential new baseline based on the current detection signal of the network device 110.

The quality criterion checking unit 152 can then be adapted to apply a quality criterion that is based on the detection signal and further based on the potential new baseline. For instance, the quality criterion checking unit 152 can be adapted to use the current detection signal of the network device 110 and to determine based on the current detection signal and the potential new baseline the presence or absence of a subject in the detection area, i.e. can provide a detection result. The quality criterion checking unit 152 can then check as quality criterion, for instance, if the determined detection result is consistent with predetermined knowledge of the detection area. For instance, if it is known that at a current time of day or night generally no subject can be present in the detection area, for instance, because the detection area refers to a shop or business building that is closed by night, the quality criterion can be considered as being fulfilled if the determined detection result that is based on the potential new baseline does not indicate the presence of a subject in the detection area.

Moreover, the quality criterion checking unit 152 can in this case be adapted to receive detection results from at least one of the other network devices 120, 130 being part of the network 100 that were obtained using the detection signals of the respective network device 120, 130 and the baseline used by the respective network device 120, 130. The quality criterion checking unit 152 can then check as quality criterion if the detection results of the network device 110 that is based on the potential new baseline and the detection results of the at least one other network device 120, 130 are consistent, i.e. are substantially similar for a predefined test period, for instance, during the next ten minutes. If the detection results are substantially similar, the quality criterion can be considered as being fulfilled, whereas different detection results for the same detection area indicate that the potential new baseline might be corrupted and not suitable as baseline for detecting the presence or absence of a subject in the detection area.

Additionally, the re-baselining control system 150 can further comprise an old baseline storing unit 155 that is adapted to store as old baseline the baseline currently used for detecting the presence and/or absence of a subject by the network 110. In this case the quality criterion checking 152 can be adapted to use detection results that are obtained based on a current detection signal provided by the network device 110 and the old baseline and further detection results that are obtained by the current detection signal of network device 110 and the potential new baseline. The quality criterion checking unit 152 can then be adapted to compare the required detection results and to determine that the quality criterion is fulfilled if the determined detection results are substantially similar, i.e. if both detection results are consistent with each other.

Moreover, the quality criterion checking unit 152 can, for this embodiment of the re-baselining control system 150, be adapted to combine the different quality criteria into one quality criterion that is fulfilled either when at least one of the parts of the quality criterion, some of the parts of the quality criterion or all of the parts of the quality criterion are fulfilled. In particular, the quality criterion checking unit 152 can be adapted to first check whether a detection result obtained using a current detection signal and the potential new baseline is consistent with pre-knowledge on the detection area, and if this is the case, then check whether for a predetermined time period the detection result obtained using the current detection signal and the new potential baseline is substantially the same as a detection result obtained by one of the other network devices using their current detection signal and their current baseline. When this quality criterion is also fulfilled, the quality criterion checking unit 152 can further be adapted to check for the next predetermined time period whether the detection result obtained based on the current detection signal and the potential new baseline and the detection result obtained by the current detection signal and an old baseline are also consistent, i.e. substantially similar. In this example, if this last check is also fulfilled, the quality criterion is considered as being fulfilled.

The re-baselining control system 150 further comprises a re-baselining unit 156 that is adapted to control the network device 110 to re-baseline if the predetermined quality criterion is fulfilled. For instance, based on the predetermined quality criterion, the re-baselining can refer to using the current detection signal as basis for a new baseline or to using a part of the detection signal of the network device 110 as basis for a new baseline. Moreover, the re-baselining can refer to using the potential new baseline as baseline if the quality criterion checking unit 152 has checked that the potential new baseline fulfills all quality criteria. In the case in which the quality criterion checking unit 152 determines that none or not all of the quality criteria are fulfilled, the re-baselining unit can be adapted to control the network device to use the old baseline as baseline or to reschedule the re-baselining to another time, for instance, to the current time plus a few minutes or a few hours.

Figure 2:
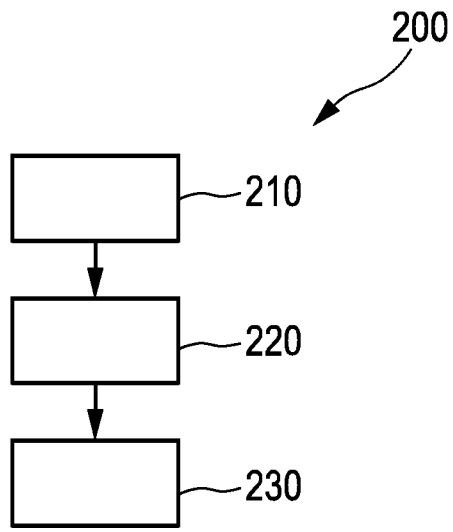
FIG. 2 shows a flow chart exemplarily illustrating an embodiment of a method for controlling a re-baselining of a network device.

FIG. 2 shows a flow chart exemplarily illustrating an embodiment of a method for controlling a re-baselining of the network device 110 being part of a network 100. The method 200 comprises a first step 210 of providing a detection signal detected by the network device 110 in the detection area, wherein the detection signal is indicative of a presence or absence of a subject in the detection area and is generally useable for determining a baseline. In a further step 220 a checking is performed if a predetermined quality criterion for a re-baselining is fulfilled based on the provided detection signal. In a last step 230 the network device 110 is controlled to re-baseline if the predetermined quality criterion is fulfilled.

After having described an exemplary configuration and general functioning of the re-baselining control system 150 according to the invention and also of the re-baselining control method 200, in the following some more specific examples for the application of the re-baselining control system 150 and method 200 to certain situations will be described.

In a first scenario the network 100 is provided in a living room of a user. In this scenario the user is lying on a couch and watching TV and has not moved for a significant amount of time, for instance, for ten minutes, perhaps due to having fallen asleep. In this case network device 110 cannot detect that the living room is occupied by the user based on the current detection signal and the currently used baseline, i.e. will provide as detection result the absence of a user in the living room. This can also be the case, for instance, due to noise when the patterns in the detection signal of the network device 110 are not completely consistent with a complete vacancy of the living room. If in this situation the network device 110 initiates a re-baselining by using the re-baselining control system, the quality criterion checking unit 152 would use the current detection results of the network device 110 to determine that no more than a predetermined maximal number of subjects, in this case, zero, is present in the detection area for the re-baselining. In this example this quality criterion could be considered as being fulfilled.

However, to ensure that no more than a predetermined maximal number of subjects is present in the detection area for the re-baselining, the re-baselining control system 150 can be adapted to use the signal initiating unit 153 as a precaution. The signal initiating unit 153 can then be adapted to use the network device 110 or any of the other network devices 120, 130 being part of the network 100 to output a visible light pattern not commonly used in daily activities of the user, for instance, a pulsating, or breathing output, a quick flashing, or quick color loops at low brightness. Using such a visible signal might be especially effective in such a situation, since when the network device 110 determines the vacancy of the room in which the user is sleeping on the couch, typically the lighting will be off, as is the common status for an empty room, such that light effects will be very noticeable in the dark room.

However, in other situations also other output mechanisms might be used and initiated by the signal initiating unit 153 instead of or in addition to visual effects. For example, if smart speakers are part of the network 100 and present in the detection area, they can be used to emit audible effects, like emitting a quick, audible sound as indication or warning that a re-baselining might start. Also predefined, preselected sounds indicating the start of a re-baselining might be created, which the user can select, or come to know over time as a warning for the re-baselining. Moreover, also tactile sensible signals can be used if network devices being part of the network 100 can provide tactile signals like vibration signals. In a special case in which the re-baselining control system is used in a context in which animals might be part of the detection area, for instance, as pets of the user, or with animals in a stable, collars might be provided to the animals with a sound emitter or a tactile signal providing unit such that the animals can be trained to leave a predetermined detection area if the audible of the tactile signal is provided via the collar.

Generally, all these outputs are meant to trigger a reaction from a user or an animal such that this reaction from the user can lead to a more noticeable signal in the detection signal detected by network device 110, for instance, due to a movement of the user or the animal. The quality criterion checking unit can then be adapted to check the detection results, i.e. to determine based on the detection signal from network device 110, if still no more than the predetermined maximal number of subjects is present. If this quality criterion is not fulfilled, for instance, in this example because the user has woken up and moved and the detection now indicates the presence of the user in the detection area, the quality criterion checking unit can consider the quality criterion as not being fulfilled and the re-baselining unit might be adapted to control the network device 110 to postpone re-baselining for a predetermined time period or until the next time the quality criterion checking unit determines that a quality criterion is fulfilled. In case the quality criterion checking unit determines that the quality criterion is fulfilled, for instance, after a short time period, like ten seconds, after the providing of the visual effect, for example, since the user has left the room, the re-baselining unit can control the network device 110 to re-baseline, i.e. in this case to determine a new baseline based on a currently detected detection signal.

In a modification, the signal initiating unit can be adapted to initiate the user perceptible output in loops, wherein the output signals become more noticeable with each iteration of the loop and the quality criterion checking unit can be adapted to check for the presence of more than the predetermined maximal number of subjects after each loop or iteration.

In an extension of the above scenario, to ensure the high quality for the baseline, although it has been confirmed by the quality criterion checking unit 152 that not more than the maximal number of subjects is present in the room after the initiation of the user perceptible output, the potential new baseline determination unit 154 can be adapted to determine a potential new baseline from the current detection signal of network device 110 instead of directly re-baselining. This might be advantageous, for instance, in the following scenario. If the user of the above scenario has fallen asleep on the couch after watching TV, he might not have noticed the visual effects provided as warning for the re-baselining and thus might not have reacted. In this case the potential new baseline will be determined from the current detection signal in the presence of the user having fallen asleep on the couch. Thus, the potential new baseline might be corrupted by the presence of the user, for instance, by the breathing motion of the user. To ensure that such a scenario is ruled out and the new baseline refers to a high quality baseline, i.e. is really determined with less than the maximum acceptable number of persons in the detection area, the quality criterion checking unit 152 can be adapted to check again if the predetermined quality criterion is fulfilled now based on the potential new baseline.

For instance, in the above scenario, additionally the old baseline storing unit 155 can be adapted to store the old baseline when the potential new baseline is determined by the potential new baseline determination unit 154 and the quality criterion checking unit 152 can be adapted to check for a predetermined test period, for instance, for a few hours, if the detection results based on a current detection signal and the potential new baseline and based on a current detection signal and the old baseline are consistent. For instance, when a significant disturbance is determined in the current detection signal, both the potential new baseline and the old baseline can be used to check for possible detections. The quality criterion checking unit 152 can use in this case a simple arbitration mechanism based on the type of disturbance, the repeatability of the disturbance over time, its similarity with disturbances seen before the re-baselining, etc., and further based on a comparison between the different detection results, to determine whether the quality criterion is fulfilled, i.e. whether the re-baselining unit should control the network device 110 to re-baseline to the potential new baseline or to use the old baseline for the future detection.

In a further exemplary situation, it is assumed, as is often the case, that if a baseline has been determined with a user still present in the room, for instance, like in the above scenario if he/she has fallen asleep on the couch, such a baseline leads to a detection result of occupancy of a room long after the user has left the room. To resolve this situation and to ensure that the baseline used for further detection has a high quality, in this case the quality criterion checking unit 152 can be adapted to check for consistency of the detection result obtained with the potential new baseline with predetermined knowledge of the detection area. For instance, if in this case an extended occupancy is detected based on the potential new baseline, it can be determined if this detection result is consistent by checking for additional significant motion. If a lack of significant motion for a long period of time is determined while at the same time it is considered that the detection area is occupied, this result is not very likely and can be determined as being inconsistent. In another example, it could be checked if the occupancy is detected beyond time periods when occupancy is unlikely, for instance, an occupancy of a kitchen between 3 am and 5 am. In a further example, it could be checked whether a pattern of behavior or motion detected by a current detection signal based on the potential new baseline is inconsistent with those expected in the specific detection area, for instance, large sudden movements might be expected in a storage room but not in a business room. Moreover, it could be checked if a breathing motion is detected, for instance, by using two or more of the network devices or by increasing the detection sensitivity of the network device, while the network device has not detected at any point in the past that someone has entered the room. Based on the specific expected scenario in a detection area different of these consistency checks can be predetermined and the quality criterion checking unit 152 can be adapted to check the predetermined quality criterion by checking the predetermined consistency scenarios and to determine that the quality criterion is not fulfilled if at least one of these scenarios is not fulfilled. In this case, it is known that the potential new baseline is corrupted or invalid and the re-baselining unit can control the network device to either schedule a new re-baselining or to again use the old baseline as baseline.

Also combinations of the above scenarios are contemplated, for instance, after having determined that a potential new baseline is consistent with predetermined knowledge about the detection area, the quality criterion checking unit 152 can additionally prompt the signal initiating unit 153 to initiate a user perceptible output as in the first scenario and/or can prompt the old baseline storing unit 155 to store the old baseline and can then further apply additional quality criteria as explained with respect to the above scenarios.

The re-baselining control system can also be applied to scenarios completely different from the scenarios described above. For example, in an embodiment, the network devices can be lighting devices for precision agriculture applications and the subjects monitored can refer to livestock, for instance, to a flock of sheep. In this case, it might be difficult to detect a single sheep under certain circumstances, but a group of sheep, for instance, three sheep, may be detectable and a barn may be heated based on the detection of the sheep in a certain area of the barn. In this case the re-baselining can be adapted to this specific scenario by adapting, for instance, the user perceptible signals to signals perceptible by the sheep, the maximal number of subjects to the minimal number of sheep that can be detected, etc.

In another scenario the re-baselining control system is applied to a network in an open plan office. In such a scenario it is ideal to create the baseline only during the night when nobody is present. However, it may still be required to occasionally also re-baseline during the day. In this case, likely there will be always someone present somewhere in the open plan office. Under these circumstances, the re-baselining control system can be adapted to the scenario by choosing a maximal number of subjects higher than zero, for instance, four people, such that the re-baselining can take place even if there are a few people present, for instance, two people during lunch, while at other times there are always more than four people in the space.

In other scenarios, the network device can be adapted to even detect small vital signs such as the movement of a beating heart or breathing movements. In further embodiments the network device can also be adapted to detect if a door of a room is half open or three quarters open based on the different wireless multipath signal patterns in a detection signal caused by the differences in wireless signal reflections. Also in these scenarios the re-baselining control system can be specifically adapted to these scenarios, in particular, with respect to the chosen quality criteria or the chosen accuracy of the quality criterion checking process.

Although in the above described embodiments, the detection signal was provided by the communication signals between the network devices of the network, in other embodiments a single network device of the network can provide the signals, i.e. can transmit radio signals that can be reflected by objects in the room and detected by the network device. For instance, a wireless radio based on a Qualcomm Dakota chip can concurrently control two radio signals and hence a first antenna may be used to transmit a wireless signal and a second antenna may be used to receive the reflected wireless multipath signals and extract from the wireless channel state information data the detection signal.

Although in the above embodiments the re-baselining control system was part of the network and in particular connected to a network device being part of the network, in other embodiments the re-baselining control system can be integrated into one or all of the network devices. Alternatively, the re-baselining control system can be a stand-alone system that only connects with the network or with one of the network devices, when a re-baselining process is initiated.

Although in the above embodiments the re-baselining control system comprises a signal initiating unit, a potential new baseline determination unit and an old baseline storing unit, it is noted that these units are only optional and the re-baselining control system can also comprise none or only a part of these units.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the providing of a detection signal, the checking if a predetermined quality criterion is fulfilled, or the controlling of the network device performed by one or several units or devices can be performed by any other number of units or devices. For instance, these procedures can be carried out by a single device. These procedures can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention refers to a system that allows to improve a detection accuracy in network RF sensing. A system for controlling a re-baselining of a network device is presented, wherein a new baseline is determined based on a detection signal detected by the network device and/or detected by other network devices, wherein the system comprises a detection signal providing unit for providing a detection signal detected by the network device and/or by other network devices in the detection area, a quality criterion checking unit for checking if a predetermined quality criterion for a re-baselining is fulfilled based on the provided detection signal, and a re-baselining unit for controlling the network device to re-baseline if the predetermined quality criterion is fulfilled. Thus, the long term detection accuracy in detecting the presence or absence of a subject in the detection area can be improved.

The invention claimed is:

1. A re-baselining control system for controlling a re-baselining of a network device being part of a network of network devices, wherein the re-baselining refers to determining a new baseline for detection of a subject in a detection area, wherein the new baseline is determined based on a detection signal detected by the network device and/or detected by other network devices being part of the network, wherein the re-baselining control system comprises:

a detection signal providing unit for providing a detection signal detected by the network device and/or by other network devices being part of the network in the detection area, wherein the detection signal is indicative of a presence or absence of a subject in the detection area and is usable for determining a baseline, a quality criterion checking unit for checking if a predetermined quality criterion for a re-baselining is fulfilled based on the provided detection signal, and a re-baselining unit for controlling the network device to re-baseline only if the predetermined quality criterion is fulfilled;

wherein the re-baselining control system further comprises a signal initiating unit, wherein the signal initiating unit is adapted to initiate a user perceptible output from the network device or a device connected to the network device via the network to notify a potential subject in the detection area of an intention to re-baseline, wherein the quality criterion checking unit is adapted to check as predetermined quality criterion if a change is detected between the detection signal detected before the user perceptible output and the detection signal detected during and/or after the user perceptible output that indicates the presence of a subject in the detection area.

2. The re-baselining control system according to claim 1, wherein the predetermined quality criterion refers to ensuring that no more than a predetermined maximal number of subjects is present in the detection area for the re-baselining.

3. The re-baselining control system according to claim 1, wherein the re-baselining unit is adapted to postpone the re-baselining until no more than a predetermined maximal number of subjects is detected in the detection area.

4. The re-baselining control system according to claim 1, wherein the re-baselining control system further comprises:

a potential new baseline determination unit for determining a potential new baseline based on the detection signal, wherein the quality criterion checking unit is adapted to check if the predetermined quality criterion for a re-baselining is fulfilled further based on the potential new baseline, wherein, if it is determined that the quality criterion is fulfilled, the re-baselining unit is adapted to control the re-baselining such that the potential new baseline is determined as new baseline for the detection of the presence or absence of a subject in the detection area.

5. The re-baselining control system according to claim 4, wherein the quality criterion checking unit is adapted to compare detection results obtained based on the potential new baseline and the provided detection signal with detection results obtained based on a baseline used by at least one other network device during a predefined test period, wherein the detection areas of the network devices partially overlap, and wherein the quality criterion is considered as fulfilled if the detection results are substantially similar during the predefined test period in the overlapping detection area.

6. The re-baselining control system according to claim 4, wherein the quality criterion checking unit is adapted to check as quality criterion the detection results obtained based on the new potential baseline for consistency with predefined knowledge about the detection area, wherein the quality criterion is considered as fulfilled if the detection results are consistent with predefined knowledge about the detection area during a predefined test period.

7. The re-baselining control system according to claim 4, wherein the re-baselining control system further comprises:

an old baseline storing unit for storing as old baseline the baseline currently used for detecting the presence or absence of a subject, wherein the quality criterion checking unit is adapted to compare detection results obtained based on the potential new baseline and the old baseline, respectively, during a predefined test period, wherein the quality criterion is considered as fulfilled if the detection results are substantially similar during the predefined test period.

8. The re-baselining control system according to claim 7, wherein if the quality criterion is not considered as fulfilled, the re-baselining unit is adapted to control the re-baselining such that the old baseline is determined as baseline for the detection of the presence or absence of a subject in the detection area and/or the re-baselining is initiated again after a predetermined time period.

9. The re-baselining control system according to claim 4, wherein the signal initiating unit is adapted to initiate the user perceptible output if a result of the checking if the quality criterion is fulfilled is ambiguous.

10. The re-baselining control system according to claim 1, wherein the user perceptible output refers to a visible, sensible or audible signal.

11. A network comprising:

a network device adapted to detect a signal indicative of the presence or absence of a subject in a detection area and to determine a presence or absence of a subject in an area based on the detection signal, and the re-baselining control system according to claim 1.

12. A re-baselining control method for controlling a re-baselining of a network device being part of a network of network devices, wherein the re-baselining refers to determining a new baseline for detection of a subject in a detection area, wherein the new baseline is determined based on a detection signal detected by the network device and/or detected by other network devices being part of the network, wherein the re-baselining control method comprises:

providing a detection signal detected by the network device and/or by other network devices being part of the network in the detection area, wherein the detection signal is indicative of a presence or absence of a subject in the detection area and is usable for determining a baseline, checking if a predetermined quality criterion for a re-baselining is fulfilled based on the provided detection signal, controlling the network device to re-baseline only if the predetermined quality criterion is fulfilled, and initiating a user perceptible output from the network device or a device connected to the network device via the network to notify a potential subject in the detection area of an intention to re-baseline;

wherein the predetermined quality criterion includes checking if a change is detected between the detection signal detected before the user perceptible output and the detection signal detected during and/or after the user perceptible output that indicates the presence of a subject in the detection area.

13. A non-transitory computer readable medium comprising instructions for causing a re-baselining control system to perform the method of claim 12.

\* \* \* \* \*